United States Patent Office 3,302,529
Patented Feb. 7, 1967

3,302,529
HYDRAULIC MINE ROOF SUPPORTS
Laurence William Taylor, Woodthorpe, and Frank Town, Burton Joyce, England, assignors to W. E. & F. Dobson Limited
Filed Jan. 18, 1965, Ser. No. 426,325
Claims priority, application Great Britain, Jan. 18, 1964, 2,315/64
8 Claims. (Cl. 91—432)

This invention is for improvements in or relating to hydraulic mine roof supports of the type in which a hydraulic prop is charged by the employment of a removable charging unit connected to an external fluid line.

An object of the invention is to provide for charging the prop without the usual difficulty of holding the charging unit in position.

The invention provides hydraulic control means for mine roof supports in which hydraulic fluid is supplied to the pressure chamber of a hydraulic prop from an external fluid line to which a hydraulic coupling is connected to provide a charging unit for removable plug-in fitment to a coupling valve of the prop, characterised by having means forming, when the charging unit is fitted, sealed passage means for the charging fluid in the region of the junction between the fluid outlet passage of the charging unit and the fluid inlet passage of the coupling valve whereby there is a balancing of forces so that pressure of the charging fluid does not oppose connection of the hydraulic coupling from the coupling valve. The sealed passage means conveniently comprises an annulus disposed about the fluid inlet passage of the coupling valve for communication with a transverse fluid outlet passage of the charging unit and at each side of the latter passage a sealing ring. Conveniently there is a releasable catch to releasably maintain the charging unit connected to the coupling valve. Conveniently the catch is embodied in the construction of the charging unit. The coupling valve communicates with an internal pipe extending through the prop's ram into the pressure chamber of the prop's cylinder, the prop also having internal valve means for automatic overload relief and manually operated release of fluid pressure.

The mine roof support may comprise two of the props each having a coupling valve for the charging unit and inter-connected by a horizontal advancing cylinder and ram. There may be a separate reservoir suitably connected by pipe lines to the advancing cylinder and ram, and in one of the pipe lines a coupling valve for connection thereto of the charging unit.

There may also be a return coupling valve on the reservoir for connection thereto of a return reservoir charging unit connected to the prop or cylinder and ram.

The above and other features of the invention set out in the appended claims are incorporated in the construction which will now be described, as a specific embodiment with reference to the accompanying drawings, in which:

Figure 1:
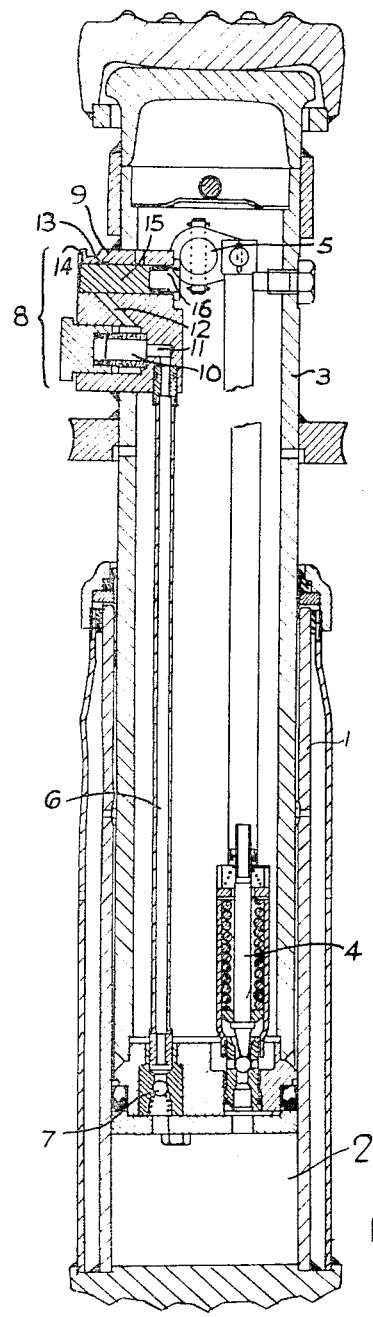
FIGURE 1 is a sectional view of a hydraulic prop according to the invention.

Referring to FIGURE 1 a hydraulic prop is provided comprising a cylinder 1 providing a pressure chamber 2, a hollow ram 3 slidable in the cylinder 1, a relief and release valve 4 in the hollow ram 3 and operable by a crank device 5 from a handle externally of the prop and a communicating pipe 6 in the hollow ram connected through a nonreturn ball valve 7 to the pressure chamber 2.

The upper end of the pipe 6 is connected to a coupling valve indicated generally at 8.

This coupling valve 8 comprises a valve block 9 having a filter chamber 10, with which the pipe 6 communicates through ducts 11, and an inclined duct 12 communicating between the filter chamber and an annulus 13 in a socket 14 housing a plunger 15 which is outwardly biased, to close the duct 12, by a spring 16.

Figure 2:
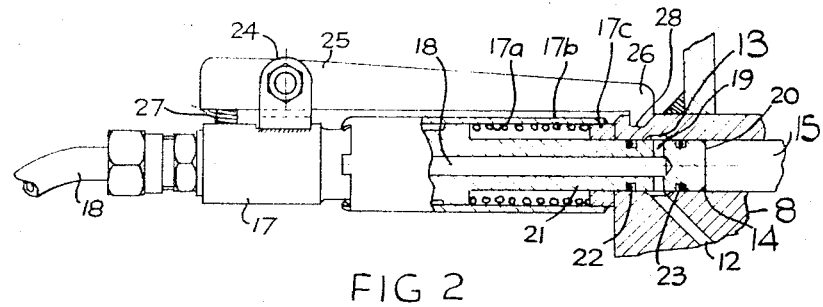
FIGURE 2 is a view partly in section of a charging unit for the prop.

For cooperation with this coupling valve 8 there is a charging unit, FIGURE 2, which comprises a body 17 connected by pipe 18 to a pressure fluid supply line. This body 17 has a central duct 18 which terminates in a transverse outlet duct 19 a short distance from the end 20 of a plug portion 21 of the unit. Fitted about this plug 21 there is a sleeve 17a which is biased by a spring in an annulus 17b for an end ring 17c to normally close the transverse outlet duct 19 so that hydraulic fluid under pressure in the unit is normally prevented from escaping from the unit.

At opposite sides of the transverse outlet duct 19 there are sealing rings 22, 23.

In addition there is pivoted to a bracket 24 on the body 17, a catch 25 having a nose end 26 and biased by a spring 27.

The coupling valve block 9 of the prop has a notch 28 to receive the nose 26 of the catch 25.

In use, when it is required to operate the prop to extend it, the charging unit is fitted to the coupling valve 8 with a plug-in fit of the plug 21 into the socket 14 as allowed by depression of the plunger 15 against its spring 16 and by displacement of the plunger 15 against its spring 16 and by displacement of the sleeve 17a against the spring 16 in the annulus 17b.

Pressure is provided against the charging unit until the catch nose 26 drops in the notch 28 and in this position of the parts the transverse outlet duct 19 of the charging unit registers with the inclined inlet duct 12 and the annulus 13 of the coupling valve 8, as shown in FIGURE 2, so that fluid under pressure is now applied transversely through the transverse outlet duct 19 and around the annulus 13, from where the fluid is directed against the seals 20, 23 and through the central bore 18 of the charging unit and through the duct 12 with the pipe 6 in the prop's ram for supplying pressure fluid to the prop's pressure chamber 2.

A particular advantage of this arrangement is that, by virtue of the annulus 13 and sealing rings 22, 23, these provide a sealed passage in the region of the junction between the transverse outlet duct 19 of the charging unit and the inclined inlet duct 12 of the coupling valve whereby fluid is contained between the seals 22, 23 and consequently there is a balancing of forces so that pressure of the charging fluid does not oppose connection of the charging unit to the coupling valve. The catch 25 serves to overcome the tendency of spring 16 to eject the charging unit and to releasably maintain the charging unit connection to the coupling valve until released to allow their disconnection.

Figure 3:
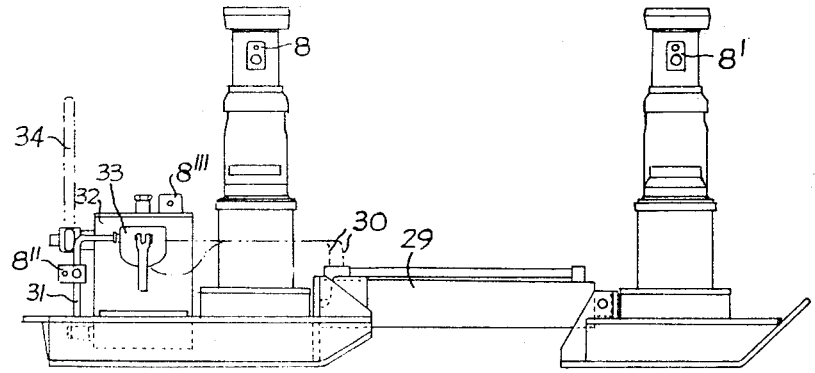
FIGURE 3 is a side view of a support embodying two props according to the invention.
Figure 4:
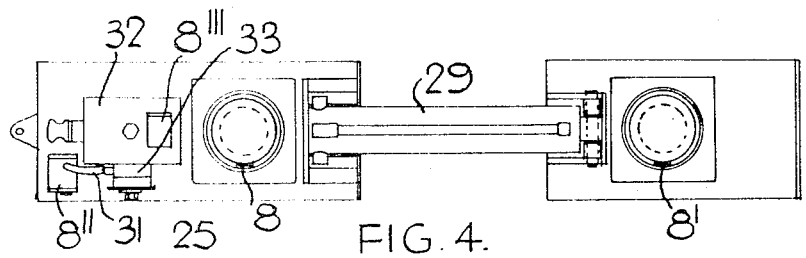
FIGURE 4 is a plan view of FIGURE 3.

Referring now to FIGURES 3 and 4 the mine roof support shown comprises two of the hydraulic props each with its own coupling valve 8, 8' for the charging unit.

These props are connected by a horizontal advancing cylinder-and-ram 29 which is connected by pipe connections 30, 31 to a reservoir 32 through a manually operated control valve 33 between the pipe connections 30 and 31. A pump handle 34 is connected to a pump (not shown) in the reservoir 32.

There may also be a coupling valve 8'' in the connecting pipeline 31 for connection thereof of the charging unit.

Figure 5:
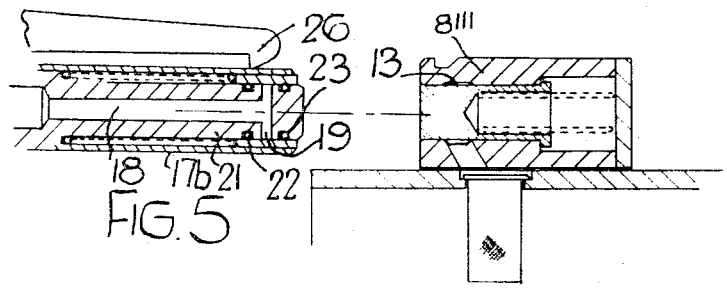
FIGURE 5 is a sectional view of return reservoir charging means used in said support.

There may also be a coupling valve 8′′′ on the reservoir 32 for connection thereto of a return charging unit. This coupling valve 8′′′ and charging unit are, as shown in FIGURE 5, substantially the same as the coupling valves and charging unit already described. This charging unit is connected to a return line from the props or cylinder and ram 29 so that, when required, the reservoir 32 can receive return fluid by fitting the charging unit to the coupling valve 8′′′ in like manner of fitting the charging unit to the coupling valve 8 already described.

What we claim is:

1. A hydraulic control means for mine roof supports in which hydraulic fluid is supplied to the pressure chamber of a hydraulic prop from an external fluid line to which a hydraulic coupling is connected to provide a charging unit for removable plug-in fitment to a coupling valve of the prop, characterised by having means forming when the charging unit is fitted, sealed passage means for the charging fluid in the region of the junction between the fluid outlet passage of the charging unit and the fluid inlet passage of the coupling valve whereby there is a balancing of forces so that pressure of the charging fluid does not oppose connection of the hydraulic coupling to the coupling valve.

2. Control means according to claim 1 wherein the sealed passage means comprises an annulus disposed about the fluid inlet passage of the coupling valve for communication with a transverse fluid outlet passage of the charging unit and at each side of the latter passage a sealing ring.

3. Control means according to claim 1 wherein there is a releasable catch to releasably maintain the charging unit connected to the coupling valve.

4. Control means according to claim 3 wherein the catch is embodied in the construction of the charging unit.

5. Control means according to claim 1 wherein the coupling valve communicates with an internal pipe extending through the prop's ram into the pressure chamber of the prop's cylinder, the prop also having internal valve means for automatic overload relief and manually operated release of fluid pressure.

6. Control means according to claim 1 wherein the mine roof support comprises two of the props each having a coupling valve for the charging unit and inter-connected by a horizontal advancing cylinder and ram.

7. Control means according to claim 6 having a separate reservoir suitably connected by pipe lines to the advancing cylinder and ram, and in one of the pipe lines a coupling valve for connection thereto of the charging unit.

8. Control means according to the last preceding claim having a return coupling valve on the reservoir for connection thereto of a return reservoir charging unit connection to the props or cylinder and ram.

References Cited by the Examiner

UNITED STATES PATENTS

| 1,223,621 | 4/1917 | Scherenzel | 91—432 X |
| 1,850,879 | 3/1932 | Hunt | 251—149.9 |
| 3,106,378 | 10/1963 | Hellstern | 251—149.9 |
| 3,180,093 | 4/1965 | Town | 60—52 |

EDGAR W. GEOGHEGAN, *Primary Examiner.*